G. K. F. JACK.
HORSE HITCHING DEVICE.
APPLICATION FILED MAR. 14, 1910. RENEWED FEB. 17, 1912.

1,038,894.

Patented Sept. 17, 1912.

WITNESSES:

INVENTOR
Greville K. F. Jack
BY
ATTORNEYS

UNITED STATES PATENT OFFICE.

GREVILLE K. F. JACK, OF CLIFTON, COLORADO.

HORSE-HITCHING DEVICE.

1,038,894.  Specification of Letters Patent.  Patented Sept. 17, 1912.

Application filed March 14, 1910, Serial No. 549,175. Renewed February 17, 1912. Serial No. 678,413.

*To all whom it may concern:*

Be it known that I, GREVILLE K. F. JACK, a subject of the King of Great Britain, and a resident of Clifton, in the county of Mesa and State of Colorado, have invented a new and Improved Horse-Hitching Device, of which the following is a full, clear, and exact description.

Among the principal objects which the present invention has in view are: to provide a hitching device for a horse, or horses, operable by the vehicle when pulled in a forward direction and arranged to release the pulling strain when said vehicle is moved in a rearward direction; to provide locking means for the wheels of a vehicle; and to provide a simple, efficient and durable harness attachment whereby the wheel of the vehicle may be limited in its action to exert a restraining influence upon the driving reins of the team attached to said vehicle.

One embodiment of the present invention is disclosed in the structure illustrated in the accompanying drawings, in which like characters of reference denote corresponding parts in all the views, and in which—

Figure 1:
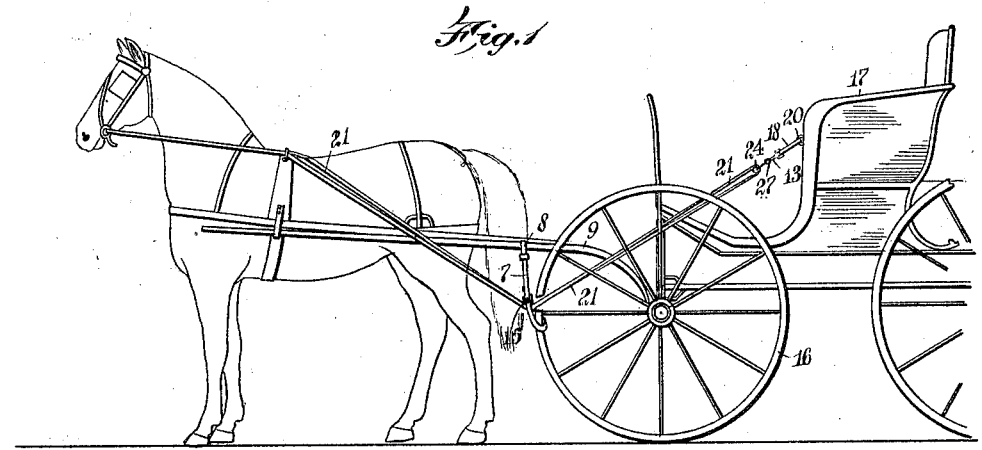
Figure 2:
Figure 3:
Figure 4:
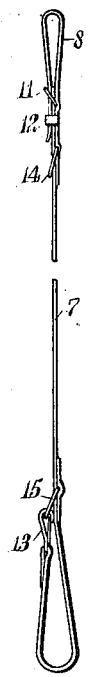
Figure 5:
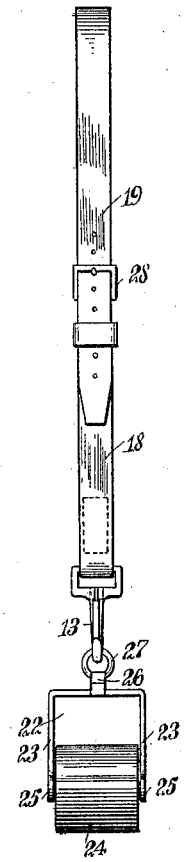
Figure 6:
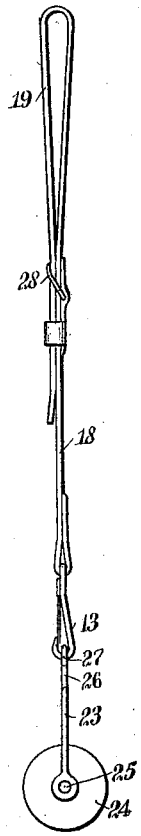

Figure 1 is a side view of a horse and vehicle attached thereto, the latter having mounted thereon a hitching attachment constructed and arranged in conformity with the present invention; Fig. 2 is a face view of the wheel locking attachment; Fig. 3 is an edge view of the same in extended position; Fig. 4 is an edge view of the same in folded position; Fig. 5 is a face view of the reins holding strap with which the vehicle is provided, having attached thereto a detention roller; and Fig. 6 is an edge view of the same.

It will be understood that the attachments hereinafter described are applicable to vehicles employing teams of two and more animals, as well as to vehicles employing only a single animal, as shown in Fig. 1 of the drawings. Where the large team, and the usual form of guiding pole is used, a strap 7 is attached to the body of the vehicle instead of to the shaft 9, as shown in Fig. 1. Whether the attachment be to the shaft or frame of the body of the vehicle, the attachment is made by forming a loop 8 from an extension sewed, or otherwise secured, to the strap 7. The loop 8 may be formed from an extension of the strap 7, although I prefer to form the loop from an additional piece. In forming the loop from the additional piece in the manner stated, the flesh side of the leather forming the loop may be disposed within the loop, while the skin side is disposed at the outside of the loop, thereby presenting a more agreeable appearance.

The strap 7 is provided at the one end with the loop 8, formed as stated, the free end of which is secured by a buckle 11 and guide loop 12, perforations 10, 10 being provided to receive the tongue of the said buckle. At the opposite end of the strap 7 is provided a hook 13. The strap 7 in its elongated position is formed to a length of about 36 inches. This length may be varied to suit.

Flexibly secured at different positions on the strap 7 are half rings 14 and 15, these being provided to be engaged by the hook 13 to form loops of larger or smaller dimensions. The loop formed by the hook 13 engaging the ring 15, as shown in Fig. 4 of the drawings, is that which is employed to engage the rim of the wheel 16, as seen in Fig. 1 of the drawings. When the hook 13 is snapped into the ring 14 the hitching device formed by the strap 7 is raised or shortened, so as not to interfere with the action of the horse or horses.

In practice, the attachment of the strap 7 by means of the loop 8 to the vehicle is permanent. When the vehicle is moving under normal conditions, with the driver in the seat, the hook 13 is engaged by the ring 14 so as to hold the hitching device in a short loop at the rear of the horse. When, however, the team is stopped and the driver has occasion to leave the vehicle, the hook 13 is disengaged from the ring 14 and passed through the wheel 16 and engaged with the ring 15. In this process, the reins 21 are drawn down so as to be included in the loop formed by the hook 13 engaging the ring 15. In this position it will be seen that within the limits of rotation of the wheel 16 permitted by the strap 7, the engaged section of the reins 21 is raised and lowered. It is when the reins are lowered that in the usual operation of this invention the strain is exerted on the mouth of the animal or animals constituting the team.

In order that the pull on the reins may be exerted as above stated, it is necessary to anchor the end of the reins 21. For this purpose there is provided a short strap 18. The strap 18 is provided with a loop 19, the free end whereof is engaged by a buckle 28. The loop 19 may be passed through the rail or other structural part of the seat 17 of the vehicle. Oftentimes I prefer to provide an eyelet 20, as shown in Fig. 1 of the drawings, through which is passed the loop 19 of the strap 18. At the free end of the strap 18 there is provided a snap hook 13 of similar construction to that employed in conjunction with the strap 7. The hook 13 is provided to engage a small ring 27, secured by means of a clip 26 upon a yoke 23, which forms bearings 25, 25 for the pivotal mounting of a roller 24, as seen in Figs. 5 and 6 of the drawings. The roller 24 is usually attached to the reins by being threaded over a single line thereof, the reins passing through a loop 22 formed by the yoke 23 above the roller 24. The reins 21 are usually parted or unbuckled and the roller 24 slipped over the line. Normally the roller 24 and parts attached thereto are carried on the end of the reins and separated from the strap 18.

When it is desired to hitch a team, the first act of the driver before leaving the vehicle is to slip the ring 27 into engagement with the hook 13. The remainder of the action of the driver in securing the reins within the loop formed by engaging the ring 15 with the loop 13 on the strap 7, is followed as above set forth.

With a hitching device of the character described, constructed and arranged in the manner set forth, the operation is as follows: The loop of the strap 7 engaging the wheel 16 is always placed on the forward side of the wheel, therefore, when the vehicle is pulled forward by a restless or frightened horse the forward part of the wheel is depressed, carrying the loop of the strap 7 downward and pulling the reins 21 therewith, in the manner shown in Fig. 1 of the drawings. This action exerts a checking pull on the mouth of the team. If the pull on the mouth of the team is continuous or violent, it is apt to cause a backing action on the part of the team. This immediately reverses the rotation of the wheel 16 causing the loop on the strap 7, to relieve the pressure on the reins and the mouth of the team. If, however, the horse is restive and continues to back, the wheel 16 is checked when the loop formed on the strap 7 has reached its rearward full extension. In this position, however, the loop is at or near the upper side of the wheel, and the reins are relaxed. The reins remain in this position until the team starts again forward, which results in a duplication of the action above described. After a few attempts of this character the horse becomes aware that he cannot move in either direction. When now the driver returns to the team, he releases the hook 13 from the ring 15, lifting the reins 21 out of engagement with the strap 7, which latter he shortens by engaging the hook 13 with the ring 14 of the said strap. The ends of the reins 21 are, during this operation, held by the roller 24 and strap 18. When the driver mounts within the vehicle he finds the reins 21 held in a convenient position by the strap 18 and roller 24 at his hand. If desired, the reins 21 may be released from engagement with the strap 18 by removing the ring 27 from engagement with the hook 13 on the strap 18.

Having thus described my invention, what I claim as new and desire to secure by Letters Patent is:—

A horse hitching device, comprising a strap member having a loop section permanently attached to the shafts of the vehicle adjacent one of the carrying wheels; a snap hook pivotally mounted on the end of said strap; a plurality of eyelets mounted on said strap at intervals to form loops in said strap when connected with said snap hook; a reins holder embodying a loop and a roller mounted therein; and a flexible attachment permanently mounted on the vehicle structure and provided with a snap hook at the end thereof to receive said loop in holding engagement whereby the reins may be held slack to accommodate the swing of the head of a horse and be slidably attached to the forward section of a carrying wheel.

In testimony whereof I have signed this specification in the presence of two subscribing witnesses.

GREVILLE K. F. JACK.

Witnesses:
 LOUIS V. GOWDEY,
 J. E. HORNBAKER.

---

Copies of this patent may be obtained for five cents each, by addressing the "Commissioner of Patents, Washington, D. C."